(12) United States Patent
Wierzbicki et al.

(10) Patent No.: US 11,451,169 B2
(45) Date of Patent: Sep. 20, 2022

(54) MULTI-DIMENSIONAL MAGNETIC LEVITATION AND TRANSLATION SYSTEM AND METHODS

(71) Applicant: REMANENCE TECHNOLOGY GROUP, LLC, Copley, OH (US)

(72) Inventors: Christian James Wierzbicki, Copley, OH (US); Fiona Marie Gaffney, Copley, OH (US); Evan Ray Tipton, Fairlawn, OH (US); Jason Richard Turschak, Stow, OH (US); Nicholas Ryan Llewellyn, Doylestown, OH (US)

(73) Assignee: REMANENCE TECHNOLOGY GROUP, LLC, Copley, OH (US)

( * ) Notice: Subject to any disclaimer, the term of this patent is extended or adjusted under 35 U.S.C. 154(b) by 55 days.

(21) Appl. No.: 17/104,304

(22) Filed: Nov. 25, 2020

(65) Prior Publication Data
US 2021/0159817 A1 May 27, 2021

Related U.S. Application Data

(60) Provisional application No. 62/939,851, filed on Nov. 25, 2019.

(51) Int. Cl.
| | |
|---|---|
| *H02N 15/00* | (2006.01) |
| *H02K 7/09* | (2006.01) |
| *F16C 32/04* | (2006.01) |
| *H02K 11/215* | (2016.01) |

(52) U.S. Cl.
CPC .............. *H02N 15/00* (2013.01); *F16C 32/04* (2013.01); *H02K 7/09* (2013.01); *F16C 32/0444* (2013.01); *H02K 11/215* (2016.01)

(58) Field of Classification Search
CPC ........ H02N 15/00; H02K 7/09; H02K 11/215; F16C 32/04; F16C 32/0444
USPC ........................................ 361/139, 144, 143
See application file for complete search history.

(56) References Cited

U.S. PATENT DOCUMENTS

| | | |
|---|---|---|
| 3,948,093 A | 4/1976 | Folchi et al. |
| 4,316,394 A | 2/1982 | Dohogne |
| 4,874,998 A | 10/1989 | Hollis, Jr. |
| 5,309,049 A | 5/1994 | Kawada et al. |
| 6,307,294 B1 * | 10/2001 | Ooyama ............ F16C 32/0451 310/90.5 |
| 6,468,041 B2 | 10/2002 | Ozaki |
| 7,107,163 B1 | 9/2006 | Hughes |
| 7,472,786 B2 | 1/2009 | Komori |
| 7,484,463 B2 | 2/2009 | Li |
| 8,115,349 B2 | 2/2012 | Mamba et al. |
| 8,258,663 B2 | 9/2012 | Smoot et al. |
| 9,979,259 B2 | 5/2018 | Puskarich et al. |
| 2007/0228852 A1 | 10/2007 | Chiang |

(Continued)

*Primary Examiner* — Danny Nguyen
(74) *Attorney, Agent, or Firm* — Vorys, Sater, Seymour and Pease LLP; Mark A. Watkins, Esq.

(57) ABSTRACT

Multi-dimensional magnetic levitation and translation systems include at least one electromagnets located on each of three perpendicular axes. The at least three electromagnets are operated using a control system to apply a nonphysical force on objects contained within the magnetic field. An object is able to be levitated within the system in spite of any variable acceleration the system experiences due to the environment. The multi-dimensional magnetic levitation system is able to linearly translate an object within its volume of control.

18 Claims, 11 Drawing Sheets

(56) References Cited

U.S. PATENT DOCUMENTS

| | | |
|---|---|---|
| 2009/0066452 A1 | 3/2009 | Hsu |
| 2009/0161284 A1* | 6/2009 | Maraval .................... B66C 1/08 361/144 |
| 2011/0050405 A1 | 3/2011 | Hollis, Jr. |
| 2011/0214982 A1 | 9/2011 | Hagen |
| 2017/0063194 A1* | 3/2017 | Puskarich .............. H02N 15/00 |

* cited by examiner

MULTI-DIMENSIONAL MAGNETIC LEVITATION AND TRANSLATION SYSTEM AND METHODS

This application claims priority benefit of U.S. Provisional Patent Application Ser. No. 62/939,851 filed Nov. 25, 2019, entitled "MULTI-DIMENSIONAL MAGNETIC LEVITATION AND TRANSLATION SYSTEM AND METHODS," the complete disclosure of which, in its entirety is herein incorporated by reference.

BACKGROUND

The present disclosure is directed toward systems and methods for translating an object from one point in three-dimensional space to another point in three-dimensional space without physically contacting the object. The systems disclosed herein, may also be configured to maintain an object's position in three-dimensional space with respect to a reference frame. More particularly, the present disclosure is directed toward the utilization of electromagnets and a control system to alter the magnetic field within a defined volume in order levitate an object while also maintaining control over the rotation and orientation of the object.

There is a long demand for control of an object in regard to its location with a volume in the manufacturing, automotive aerospace, commercial, medical, logistical, and industrial markets. While there have been attempts to control the movement of an object within a defined space, current three-dimensional translation systems lack the ability to adjust levitation and/or translation in response to external stimuli, e.g., system acceleration, temperature increases, etc. Furthermore, current systems lack precise control over the movement and orientation of an object. Some systems, which utilize high frequency and/or speed springs or use other moving parts, have a relatively high failure rate and lack software control.

In an industry 4.0 setting, software-based manufacturing technology is essential to process improvement and multiple ROI. Furthermore, it is desirable to provide contactless force for levitating and/or translating an object while reducing the number of moving parts of the translation system. It is also desirable to provide software control for customizable solutions, data point exposition for data science opportunities, and improved accuracy of the translation of objects. The systems and methods of the present disclosure overcome these and other issues known in the art.

BRIEF DESCRIPTION

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

In accordance with some aspects of the present disclosure, described are exemplary systems for levitating and/or translating a target object. In one exemplary embodiment, the system includes a frame defining a volume and at least one electromagnet mounted to the frame. The at least one electromagnet is configured to generate a magnetic field within the frame defined volume in response to an applied electric current. The system also includes a power source that is configured to supply the electric current to the at least one electromagnet. A device controller is operatively connected to the power source and the at least one electromagnet. In a further embodiment, the frame comprises at least one support structure, wherein the at least one electromagnet is mounted to the at least one support structure wherein the electromagnet is configured to generate a maximum field strength within said volume. In another further embodiment, the system includes three electromagnets in a spaced-apart relationship, wherein a first electromagnet is positioned to generate a maximum field strength in a first direction, a second electromagnet is positioned to generate a maximum field strength in a second direction and, a third electromagnet is positioned to generate a maximum field strength in a third direction, wherein each of the first, second and third directions are perpendicular to each other. In another further embodiment, the system further includes a three dimensional positional tracking system comprising at least one sensor that determines a positional state of the target object by generating an output of three-dimensional coordinates representing the positional state of the target object. In another further embodiment, the system further includes at least one sensor coupled to the frame configured to determine a direction and magnitude of external forces acting on the frame, wherein the controller is configured to adjust the magnetic field based on the measured external forces to maintain a first positional state of the target object. In another further embodiment, the device controller includes a processor in electronic communication with a storage medium, the processor configured to receive information from at least one positional sensor and determine a positional state of the target object. In another further embodiment, the system further includes a current driver device in communication with the device controller, the current driver device operable to supply a current to an associated electromagnet. In another further embodiment, the frame is composed of a non-ferrous material. In another further embodiment, the at least one sensor is a thermometer configured to determine a temperature of the target object, and wherein the control device adjusts the generated magnetic field in response to detected temperature changes of the target object. In another further embodiment, the at least one sensor is a thermometer configured to determine a temperature of the at least one electromagnetic, and wherein the control device adjusts the current applied to the electromagnet in response to detected temperature changes. In another further embodiment, the system includes six electromagnetics, wherein a first and second electromagnet are positioned in a spaced-apart relationship along a first axis, a third and fourth electromagnet are positioned in a spaced-apart relationship along a second axis, and a fifth and sixth electromagnet are positioned in a spaced-apart relationship along a third axis, wherein each of the first, second and third axis are perpendicular to each other.

In accordance with another aspect of the present disclosure, a method for levitating and moving a target object without physical contact of the target object is provided. The method includes placing a target object within a volume defined by a frame. Then, a first positional state of the target object is determined by at least one sensor. The method further includes generating a magnetic field by applying an electric current to at least one electromagnet, wherein the magnetic field is configured to apply a magnetic force on the target object to either maintain the first positional state of the target object or move the target object to a second positional state. In a further embodiment, applying the magnetic force on the target object maintains the first positional state of the target object. In another further embodiment, applying the magnetic force on the target object moves the target object from the first positional state to a second positional state. In another further embodiment, the method further includes determining a path of movement from the first positional state to a second positional state, wherein the application of a magnetic force on the target object moves the target object along the determined path of movement. In another further embodiment, the first positional state is a location in 3-dimensional space with respect to the frame. In another further embodiment, the first positional state is an orientation of the target object with respect to the frame. In another further embodiment, the frame is configured to position three electromagnets in a spaced-apart relationship, wherein a first electromagnet generates a first magnetic field and is positioned to generate a maximum field strength in a first direction, a second electromagnet generates a second magnetic field and is positioned to generate a maximum field strength in a second direction and, a third electromagnet generates a third magnetic field and is positioned to generate a maximum field strength in a third direction, wherein, each of the first, second and third directions are perpendicular to each other and, wherein, magnetic field generated is the product of the first, second and third magnetic fields. In another further embodiment, the method further includes measuring the temperature of the target object with a thermometer and adjusting a magnetic field strength based on the measured temperature. In another further embodiment, the method further includes measuring a temperature of the at least one electromagnetic and adjusting the current applied to the electromagnet in response to detected temperature changes of the at least one electromagnet.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
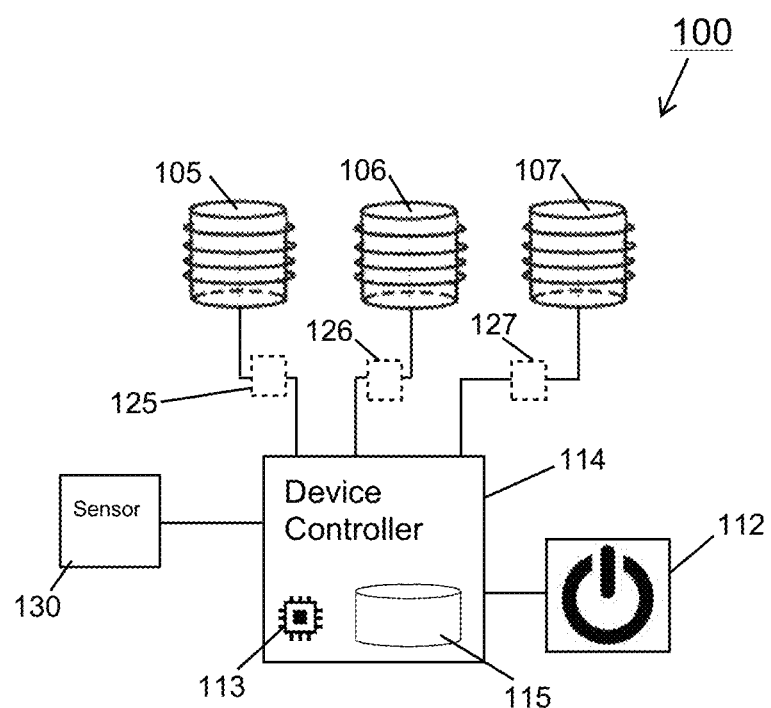
FIG. 1 is a block diagram of an exemplary multi-dimensional magnetic levitation system in accordance with the present disclosure.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms or words that require the presence of the named ingredients/components/steps and permit the presence of other ingredients/components/steps. However, such description should be construed as also describing compositions, articles, or processes as "consisting of" and "consisting essentially of" the enumerated ingredients/components/steps, which allows the presence of only the named ingredients/components/steps, along with any impurities that might result therefrom, and excludes other ingredients/components/steps.

As used herein, "levitation" is defined as the state of an object suspended in three-dimensional space without making any physical contact with another object. This differs from the state of an object that is in "free fall" which experiences a constant acceleration due to gravity. A levitated object experiences an additional non-contact force opposing gravity and other external forces such that the net force acting on the levitated objection is zero.

As used herein, "electromagnets" are defined as magnets in which the resultant magnetic fields are created by an electric current running through a wire wrapped around core. The electromagnet core may be a solid continuous piece of material or include an air gap. Core materials include but are not limited to ferromagnetic and ferromagnetic materials, e.g., iron. An electric current provided in the coil aligns the magnetic domains of the core, therefore magnetizing it. Electromagnets selectively generate magnetic fields in which objects can be levitated. The magnetic force that an object experiences in the magnetic field is able to counteract all forces disruptive to the state of the object. The use of electromagnets is advantageous in that the magnetic field can be quickly changed by controlling the amount of electric current in the winding. Electromagnets are able to be scaled based on the relevant details of a target object for levitation. The magnetic core size, the gauge of wire wrapped around the electromagnet core, the number of turns of wrapping around the electromagnet core, and the intensity of the electric current flowing through the wire are all factors that affect both magnetic field geography and geometry. The manipulation of the shape and strength of the magnetic field allows for the systems described herein to scale to virtually every possible utilization of the disclosed technology.

As used herein, the "Volume of Control" is defined as the volume contained within the innermost boundary of an arrangement of electromagnets. This volume can be approximated by a spatial region with points tangent to each of the electromagnets positioned in three dimensions. The shape and size of the volume depends on the shape, size, and electric current of the electromagnets. This Volume of Control is the space in which a target object is able to have its position changed or maintained by a change in the magnetic field generated by the electromagnets.

The disclosed systems and methods utilize an arrangement of electromagnetics and a position tracking, acceleration dependent control system to translate an object from one three-dimensional point in a volume ("initial set point" or "first positional state") to another three-dimensional point in that same volume ("desired set point" or "second positional state"). The translation is performed within a predetermined amount of time without any external contact force acting on the target object. The control system, including a device controller, acquires and utilizes data obtained from at least one sensor. For example, the device controller acquires and utilizes acceleration data via accelerometer readings, apparatus orientation data via gyroscope outputs, temperature data via temperature sensor outputs, electrical current readings via electrical current sensor outputs, target object orientation data via any orientation position tracking system from which full rotational information can be derived, and any position tracking system from which three-dimensional coordinates of the levitated object can be derived. The software mechanisms of the control system use this data, combined with its own logic, to determine electrical current outputs to the current driving components. When received, these current drivers, drawing power from a power source, output a desired amount of electrical current to certain electromagnets within the arrangement of electromagnets, changing the field strength and allowing for desired translation of the target object. The control system is capable of operation on any number of processing units for the purpose of achieving the translation of an object from initial set point to desired set point in a predetermined amount of time, while also maintaining control over the levitated object's rotation and/or orientation. The disclosed systems do not require any assistive materials, i.e. ferrofluids or paramagnetic liquid to facilitate control over a target object, making it a completely contactless form of levitation. Rather, exemplary embodiments utilize various fields output across multiple axes from electromagnets in order to balance force vectors dynamically to maintain direct levitation at a desired set point at a specific time regardless of acceleration within a reasonable change in motion of the apparatus. The configuration of the exemplary systems allow for compensation when additional acceleration is introduced from any direction.

FIGS. 1-6, illustrate the components of an exemplary system 100 for contactless levitation and/or multi-dimensional translation of an object in accordance with the present disclosure. The multi-dimensional magnetic levitation ("MDML") system 100 includes a frame 102 that surrounds a volume V. The frame 102 is configured to mount and orientate at least two electromagnets 105-107 in a spaced-apart relationship and at particular points around the volume V. The number of electromagnets supported by frame is non-limiting. While the exemplary systems described and illustrated herein provide three or six electromagnets, it is to be appreciated that any number of electromagnets may be utilized by a MDML system. Furthermore, in some embodiments, that include a base 104, electromagnets may also be mounted and oriented on the base. Briefly, electromagnets 105-107 generate a magnetic field within the volume V that is generally shaped by the number and arrangement of the electromagnets, size of the electromagnets, and intensity of an applied electrical current to each of the electromagnets 105-107. That is, the spaced apart electromagnets 105-107 are in electrical connection with a power supply 112 and are configured to generate a magnetic field within the volume V upon application of an electric current. The electromagnets 105-107 are configured to generate a magnetic field that acts on and manipulates the position of a target object 150. The greater the current applied to the electromagnet 105-107 the stronger the resulting magnetic field, and vice-versa.

The exemplary frame 102 is composed of a plurality of spaced apart support structures 103 that, in some embodiments, extend substantially perpendicular from a base 104. While the illustrated embodiments depict support structures extending from a base 104, the presence of the base is non-limiting and it is to be understood that the a plurality of support structures may support the frame 102 on a surface by direct contact with the surface, e.g., like the legs of a stool. In other embodiments, let support structures of one frame 102 may connect to the support structures of a second frame. The spaced apart support structures 103 may be hollow and configured to house wiring, electronic components, and/or sensors of the MDML system 100. Each support structure 103 is also configured to hold/mount at least one electromagnet, e.g., electromagnets 105-107, at a desired location and oriented in relation to a volume V. That is, the electromagnets 105-107 are positioned about the frame 102 such that a magnetic field is generated within the volume V. While illustrated as a substantially rectangular prism, it is to be understood that the shape of the frame 102 and number of support structures 103 is non-limiting. That is, the design of the frame 102 is based on the circumstances of its implementation and the frame 102 may have any number of support structures 103 arranged in any spaced-apart relationship. For example, and without limitation, a frame may include three support structures arranged in a generally triangular prism shape. In other embodiments, the frame 102 may have curved support structures surrounding a spherically shaped volume V.

In some embodiments, the frame 102 is composed of material that is not magnetic, e.g., composed of non-ferrous materials. In these embodiments, the material of the frame 102 is selected such that the material of the frame 102 does not interact or only minimally interacts the magnetic field generated within the volume V by the electromagnets 105-107. Examples of non-ferrous materials include but are not limited to polymers (rubber and plastics), and non-magnetic metals such as aluminum, copper, brass, bronze, golds, silver and alloys thereof. In some embodiments, wherein the frame 102 houses electrical components, the frame material is selected such that it magnetically and electrically shields the interior electrical components from influencing the magnetic field within the volume V. Shielding is discussed in greater detail below.

In other embodiments, the frame 102 or selected portions thereof is composed of a magnetic material, e.g., ferrous materials. In these embodiments, the frame 102 and/or support structures 103 contribute to the magnetic field generated within the volume V of the frame 102. Examples of magnetic material include, but are not limited to, iron, nickel, cobalt, and alloys thereof. In these embodiments, the electric current required to suspend a target object 150 by the plurality of electromagnets 105-107 may be reduced since the frame also contributes to the magnetic field within the volume V. In yet still other embodiments, portions of a frame 102 may be used as a core for an electromagnet. That is, a portion of the frame 102 may be wrapped with a wire, such that current flowing through the wrapped wire (from power source 112) enhances the magnetic field produced by that portion of the frame 102.

Figure 2:
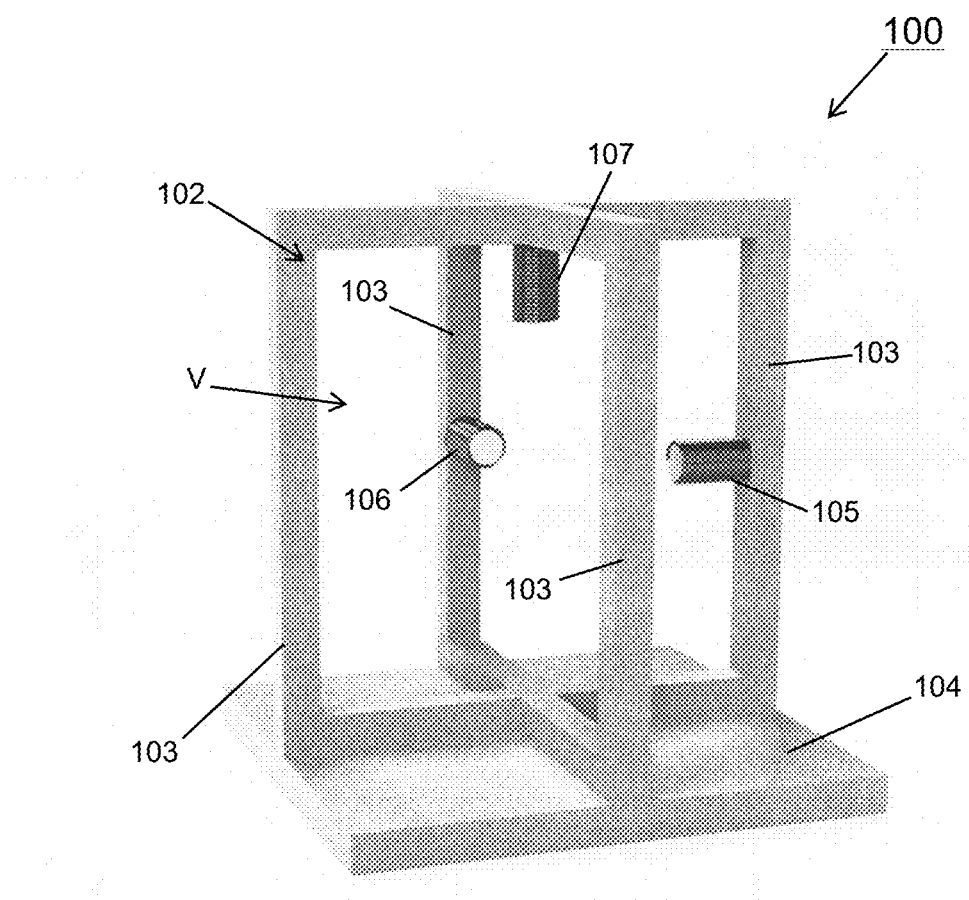
FIG. 2 is a drawing of an exemplary multi-dimensional magnetic levitation system in accordance with the present disclosure.
Figure 2:
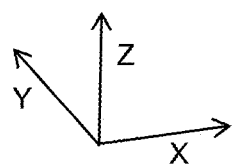
Figure 3:
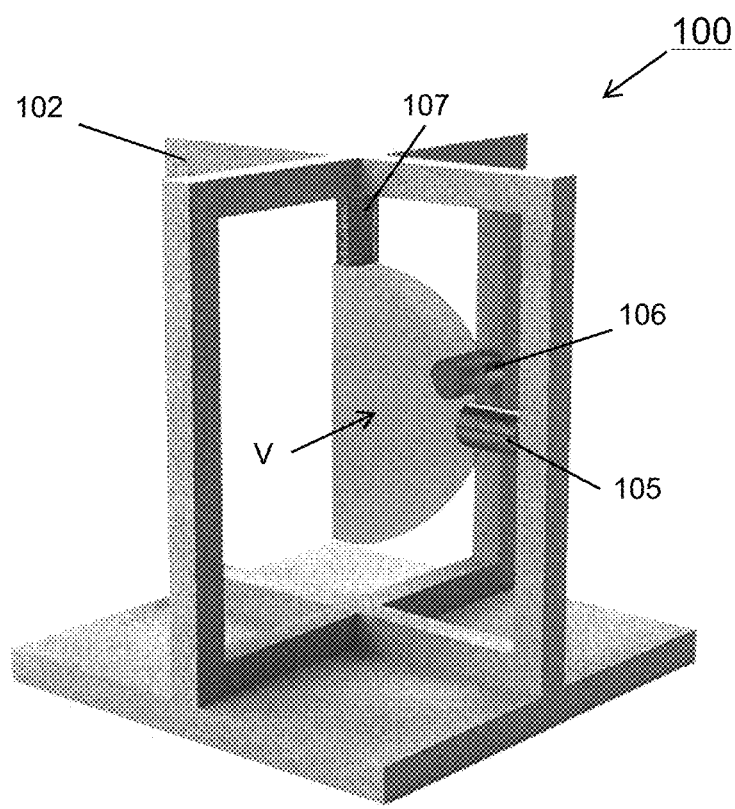
FIG. 3 is a drawing that illustrates the volume of control for the exemplary system of FIG. 2.

As described above, the frame 102 generally outlines a volume V. In some embodiments and as illustrated in FIG. 2, the support structures 103 each support at least one electromagnet 105-107. The support structures 103 and electromagnets mounted thereon may each be positioned in a spaced-apart relationship with respect to each other and in varying directions in three-dimensional space. As illustrated in the exemplary embodiment, each support structure 103 may position each associated electromagnet 105-107, on perpendicular axis in three dimensions, e.g., each of the X, Y, and Z axes. That is, each electromagnet is positioned to have a maximum field strength in a direction perpendicular to each other electromagnet. In some embodiments, the electromagnets 105-107 of the MDML system 100 are each arranged on one of three perpendicular axes. That is, electromagnet 107 is positioned such that it produces a maximum field strength in the Z-direction, electromagnet 105 is positioned such that it produces a maximum field strength in the X-direction, and electromagnet 106 is positioned such that it produces a maximum field strength in the Y-direction. In other embodiments, the frame 102 is configured to position the electromagnets 105-107 such that each electromagnet is positioned in a spherical spaced-apart relationship. That is, each electromagnet 105-107 is positioned at varying points on a conceptual unit sphere.

The electromagnets 105-107 are strategically positioned with respect to the volume V for manipulating (i.e., translating or maintaining the position of) a target object positioned therein in each direction of three-dimension space. Due to the utilization of multiple electromagnets 105-107, the magnetic fields created by each of the electromagnets 105-107 will interact with one another. That is, the magnetic field generated by one electromagnet 105, will interact with the magnetic fields generated by each of electromagnet 106 and 107. This interaction is a product of the electromagnetic force induced by an electric current through an electromagnet 105-107. The total magnetic field is manipulated by individual fields produced by the electromagnetics such that the target object 150 within the volume V experiences near balanced forces, allowing for stable levitation. The orientation of the target object 150 is also capable of being manipulated via changes made to the multiple magnetic fields acting upon it. Translation within the volume V is possible due to the continuous Field Interaction, such that the target object 150 maintains levitation before, throughout and thereafter specified translation. That is, the magnetic field is such so that a net force of greater than zero acts on the target object 150 to produce movement in a desired direction. For example and without limitation, increasing the electromagnetic force in a direction, e.g., the x-direction, by increasing the electric current supplied to the associated electromagnet, e.g., electromagnetic 105, provides a net force for moving the target object 150, in the x-direction. It is to be appreciated that while the illustrated embodiments show the x, y, x axes/coordinate system in relation to the base 104/ground, any three dimensional coordinate system may be utilized and rotated in any direction without delineating from the scope of this disclosure.

The perpendicular configuration of the magnets 105-107 may simplify the software programming, tuning and debugging of the system. Although there may be advantages to other orientations from an integration point of view (i.e., space constraints of an application not allowing for electromagnets of necessary size along each axis) the configuration of the exemplary embodiments allow for a much wider range of system integration based on application requirements while enabling the ability to scale control system parameters based on electromagnet size and levitated object mass alone. That is, the present exemplary embodiments do not require specific and limiting integrations due to the methods to balance force vectors. While some currently available systems can enact similar levels of control of a target object 150, achieving stable levitation is very resource intensive via other training methods such as simulation. Stable levitation is even more difficult to achieve via traditional feedback systems and/or human-derived models. This is generally due to the extremely complex mathematics and cases that govern electromagnetism and field interaction.

Figure 7A:
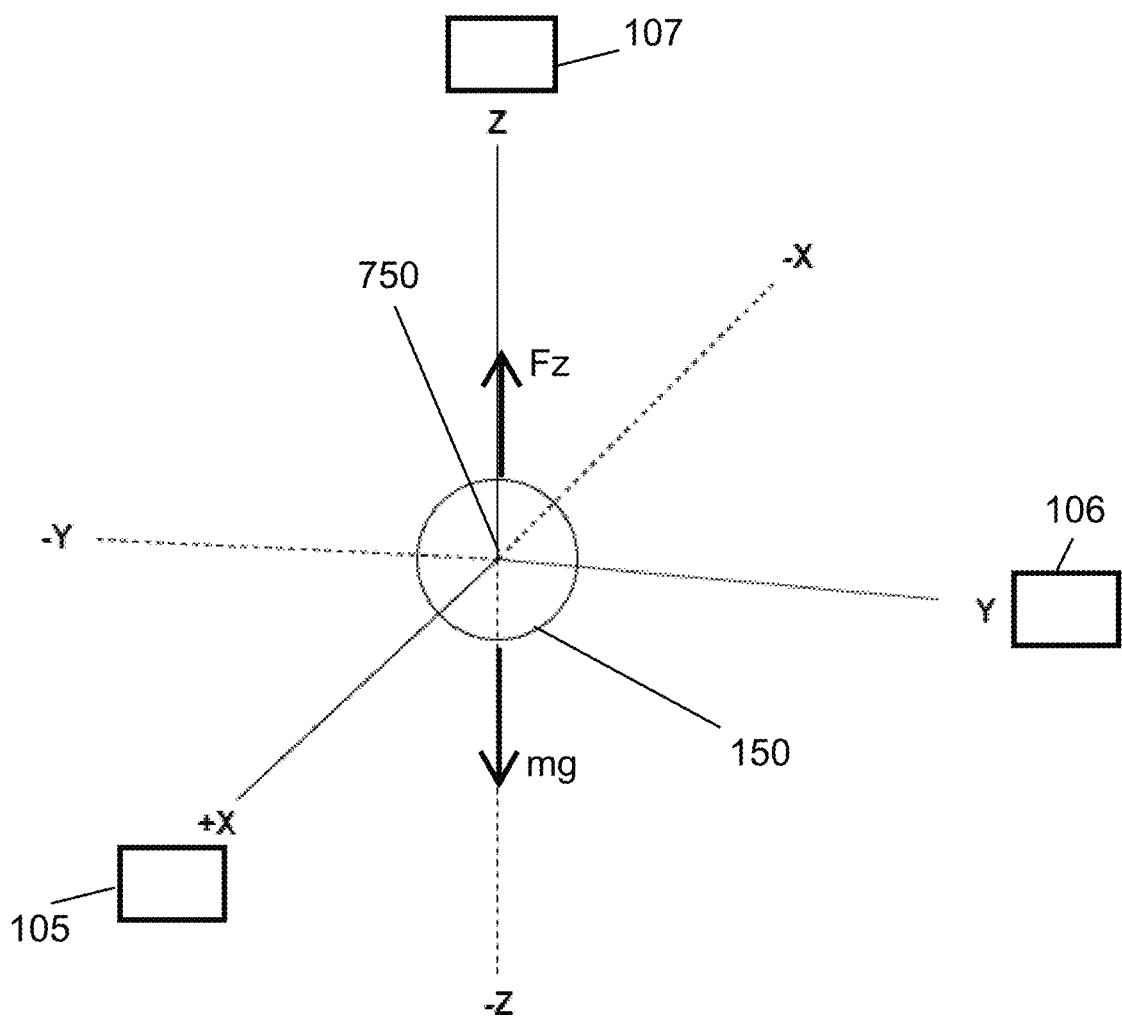
FIG. 7A illustrates a force body diagram of a levitated object while an exemplary system is subject to an external force.
Figure 7B:
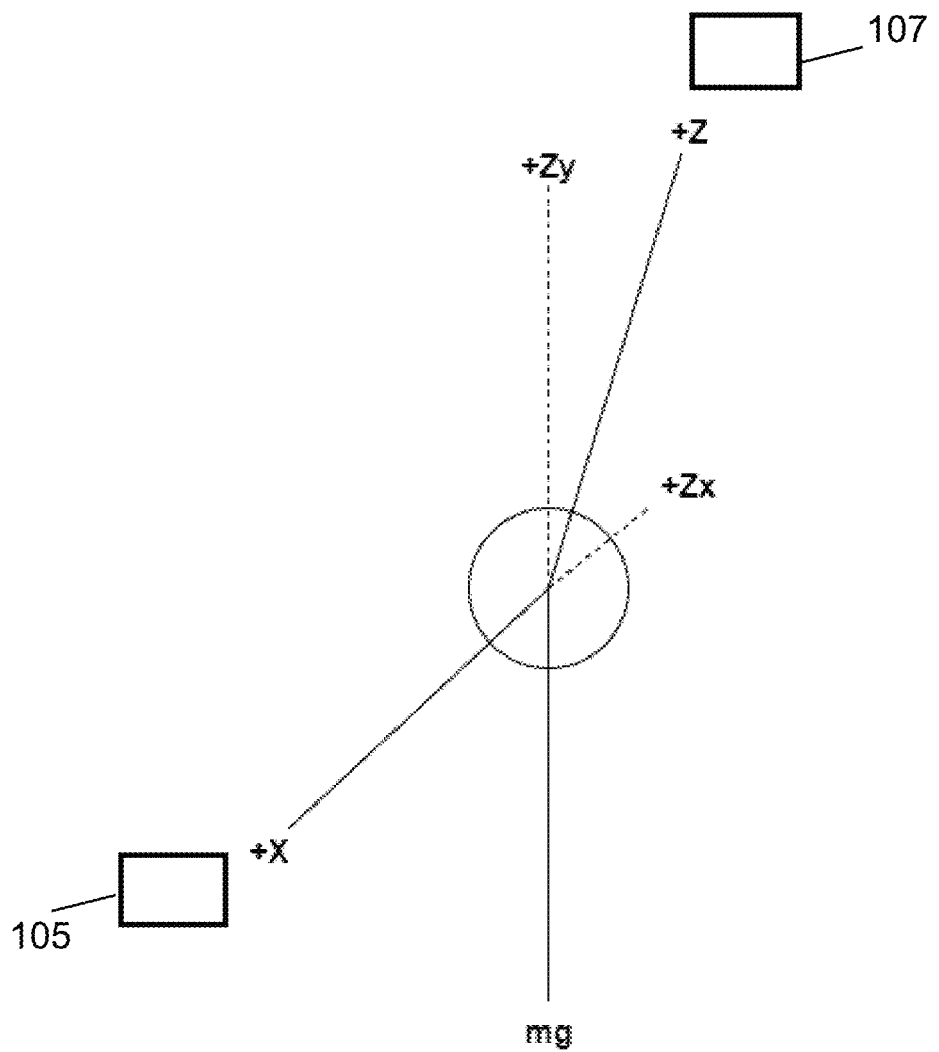
FIG. 7B illustrates a force body diagram of a levitated object undergoing a translation.

The balance of force vectors is illustrated in FIGS. 7A and 7B. Generally, the origin point 750 may be the most stable point of levitation when the only forces acting on the target object 150 are the force of gravity mg and the varying electromagnetic force Fz from the electromagnet 107 in the Z direction. In this example, the origin point 750 in a 3-dimensional coordinate system is described as (0, 0, 0). The vector balancing across these three dimensions is very simplistic in that the electromagnetic force from each electromagnet 105-107 acts directly on the target object 150 as components Fx, Fy, and Fz at the center of the volume V. As illustrated in FIG. 7A, the target object 150 is directly under electromagnet 107 and in line with perpendicularly orientated electromagnets 105, and 106 respectively. This allows electromagnets 105-107 of each axis to directly oppose any changes in acceleration of the entire system (apparatus) 100. For example and without limitation, the electromagnetic force Fz=2 N (Newtons) to directly oppose the force of gravity of 2 N on the Z-axis. When the entire system/apparatus 100 is bumped e.g., by a passerby, opposing external forces are applied accordingly across the X and Y axes (e.g., F external x=0.5 N and F external Y=1 N). This newly introduced external acceleration (bump), which is present across 3 axes, can be measured, calculated, and directly counterbalanced by electromagnetic forces Fx=0.5 N, Fy=1 N, and Fz=2 N such that the levitated target object 150 maintains its position at the origin (0,0,0) 750. The response speed of the system 100 to address external forces is primarily based by the frequency of data collection from sensors and subsequent processing.

In some embodiments, a conceptual unit sphere is employed to establish each electromagnet 105, 106, 107 at spherical coordinate points (1, 0, 0), (1, pi/2, 0), and (1, 0, pi/2), respectively. This allows for the control system 114 to be aware of the position of the target object 150 relative to these points, which are representative of the edge of each electromagnet facing the volume V. This awareness allows for proper vector decomposition using up to 3 axis of control. In this way, the positions of each electromagnet are defined along their axis and provide constraints for the volume of control (defined as radius=1). The use of this system requires the levitated object's ideal position to be the defined origin of the spherical coordinate system, as well as requires positional coordinates (x, y, z) to be derived from raw position sensor input such that it can be transformed and placed within the defined spherical coordinate system. By keeping this defined environment constant and performing transformations only once per cycle on raw position input data, computational speed is greatly increased in a machine learning context.

When the target object 150 is not located at the center of the volume of control (origin point 750), such as following a translation initiated by at least one of the electromagnets 105-107, vectors representing the forces on the target object 150 are balanced across all axes relative to its translated position in space and each electromagnet as illustrated in FIG. 7B.

FIG. 7B illustrates a force body diagram of a levitated target object 150 undergoing a translation in the x-direction. That is, the electromagnet 105 provided along the x-axis is providing a Force +X to change the motion of the target object 150 in the x-direction. For example and without limitation, the target object 150 undergoes a translation across the x-axis moving from the origin point 750 (0,0,0) to a translated point with coordinates (12, 0, 0). Stable levitation is achieved with decomposition of force +Z (from electromagnet 107). The electromagnet 107 positioned with respect to the z-axis provides a force +Z that is greater than mg, such that the vertical component of the electromagnetic force Zy is equal and opposite to the force of gravity mg. The x-axis component of force +Z is countered by the electromagnetic force +X from electromagnet 105.

Various combinations of electromagnetic force from electromagnets 105-107 are dependent on a desired acceleration of the target object 150 (in order to achieve translation within time and path constraints). This may be achieved through a machine learning model described in greater detail below. The configuration allows for the control system to process data effectively by way of triple reference point spherical coordinate system, as well as makes the system 100 more versatile. With reference to FIG. 1, the MDML system 100 also includes a power supply 112 that is configured to provide an electrical current to the electromagnets 105-107 and, therefore, generate a magnetic field within the volume V. That is, the power supply 112 is in electronic communication with at least one electromagnet 105-107. In some embodiments, the power supply 112 is a Direct Current (DC) power supply. In other embodiments, the power supply 112 is an Alternating Current (AC) supply. The AC or DC power supply supplies enough electrical current to impart a desired magnetic force on a target object 150 located within the volume V. It is to be appreciated that the amount of current provided to each of the electromagnets 105-107 is dependent on the scale of the MDML system 100. For example, and without limitation, larger target objects require a stronger magnetic field/magnetic force for manipulation, which in turn, requires a higher current flow through the at least one electromagnet 105-107.

Figure 4:
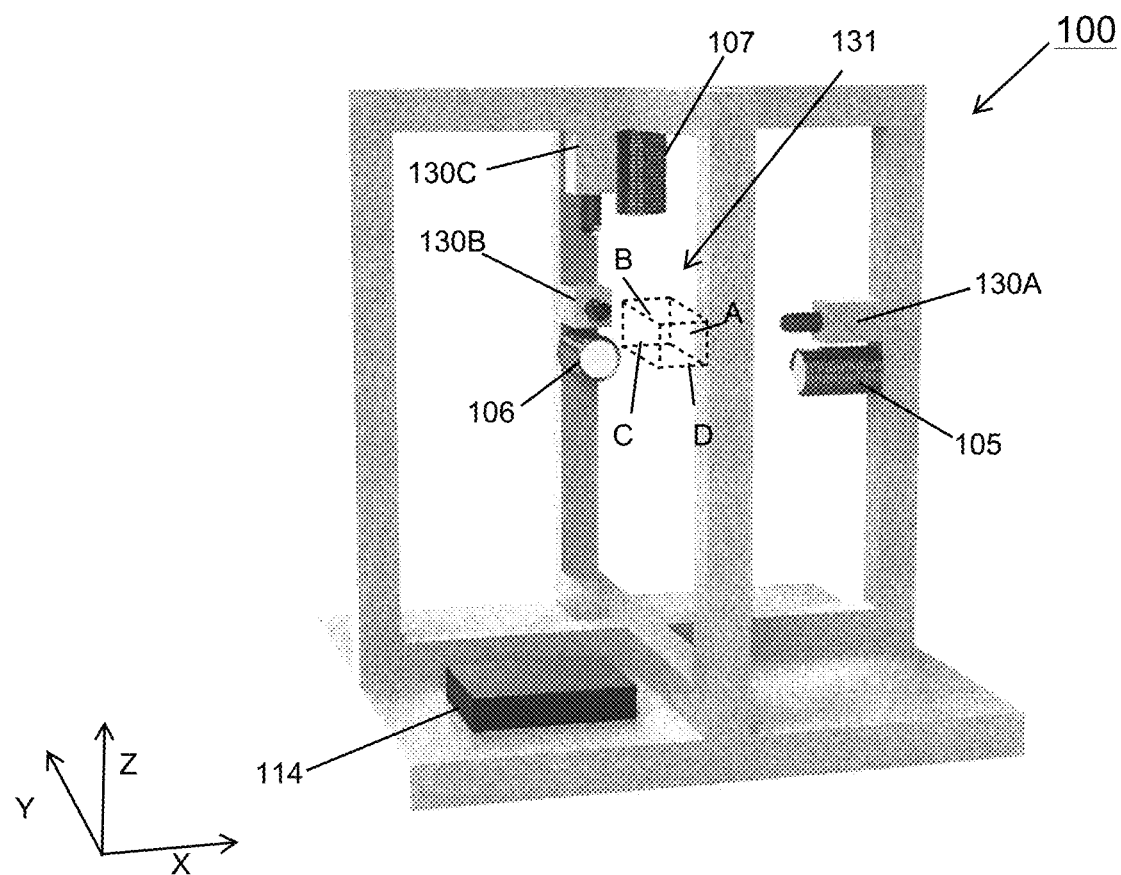
FIG. 4 is a drawing of the exemplary multi-dimensional magnetic levitation system of FIG. 2 including a device controller and sensors.

With reference to FIGS. 1 and 4, the MDML system 100 also includes a device controller 114 (also referred to herein as a control system) which is capable of operating the various components of the MDML system 100, e.g., electromagnets 105-107, sensors 130, etc. The device controller 114 may generally include an electronic processor 113 and a non-transitory storage medium 115 capable of storing instructions readable and executable by the device controller 114 to perform levitation and translation processes. The electronic processor 113 of the device controller 114 may be variously embodied and may comprise a microprocessor, a graphical processing unit (GPU), application-specific integrated circuit (ASIC) and/or the like and ancillary electronics (discrete electronic components, RAM, or other IC components). The non-transitory storage medium 115 may comprise a hard disk drive, RAID array or other magnetic storage medium, a solid state drive (SSD), flash memory or other electrical storage medium, an optical disk or other optical storage medium, various combinations thereof, and/or so forth.

The device controller 114 operates the electromagnets 105-107 by controlling of the flow of electrical current from the power supply 112 to each of the electromagnets 105-107. In some embodiments, the current applied to each electromagnet 105-107 is determined by computer algorithms (software). That is, the device controller 114 includes software that processes sensor inputs (described in greater detail below) and performs mathematical operations and transformations on the acquired inputs in order to yield numerical outputs that determine electric current values. The output electrical current values are sent to and adjust a current driving component 125-127 associated with each electromagnet 105-107. The current to each electromagnet is adjusted providing a change in the strength in the magnetic field in at least one direction or combination thereof, to perform a desired movement of a target object 150.

In some embodiments, the MDML system 100 further includes an electrical current driving device 125-127 for each electromagnet 105-107. The current driving device 125-127 associated with each electromagnet 105-107 allows accurate and precise electric current delivery from the power source 112 to the associated electromagnet. In this way, the strength of the magnetic field is controlled to tight tolerances. In some embodiments, the current driving components 125-127 are motor-bridges, placed along the frame such that adequately short signal lines from the device controller 114 and power lines to their respective magnets are realized. In some particular embodiments, the electrical current driving devices are DC motor speed controllers, such as part no. 200337 available from DROK (www.droking-.com). The current driving devices 125-127 provide adequate noise reduction to ensure consistent voltages, high frequency electric current adjustment via PWM (digital signal) control, and maintain the ability to output adequate amperage to the associated electromagnet in order to maintain stable levitation of the current design's levitated object.

The device controller 114 is also operatively connected to at least one sensor and/or tracking system 130 including but not limited to position sensors, movement sensors, optical sensors, temperature sensors, magnetic field sensors, and electrical current sensors. In some embodiments, the at least one sensor 130 is a gyroscope. A gyroscope is a sensor device that outputs angular velocity independent of linear velocity. The gyroscope of the MDML system 100 provides orientation information/data to the device controller 114 to ensure stable levitation of a target object 150. That is, the gyroscope allows the device controller 114 to choose which electromagnet 105-107, or a combination of magnets, will provide a restorative force to oppose the force gravity acting on the target object 150. The orientation information allows for the MDML system 100 to control which electromagnet 105-107 will be providing stabilization and scale the electromagnetic force accordingly.

Figure 5:
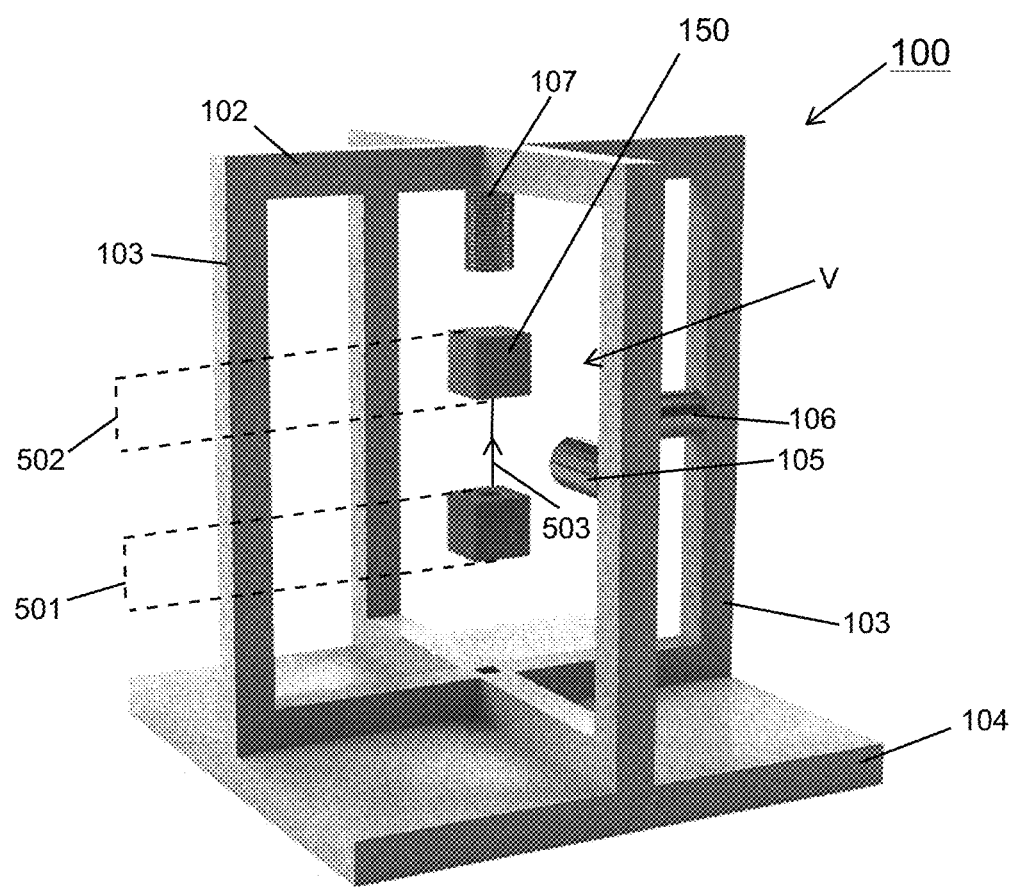
FIG. 5 is a drawing illustrates an example of object translation by a multi-dimensional magnetic levitation system in accordance with the present disclosure.
Figure 6:
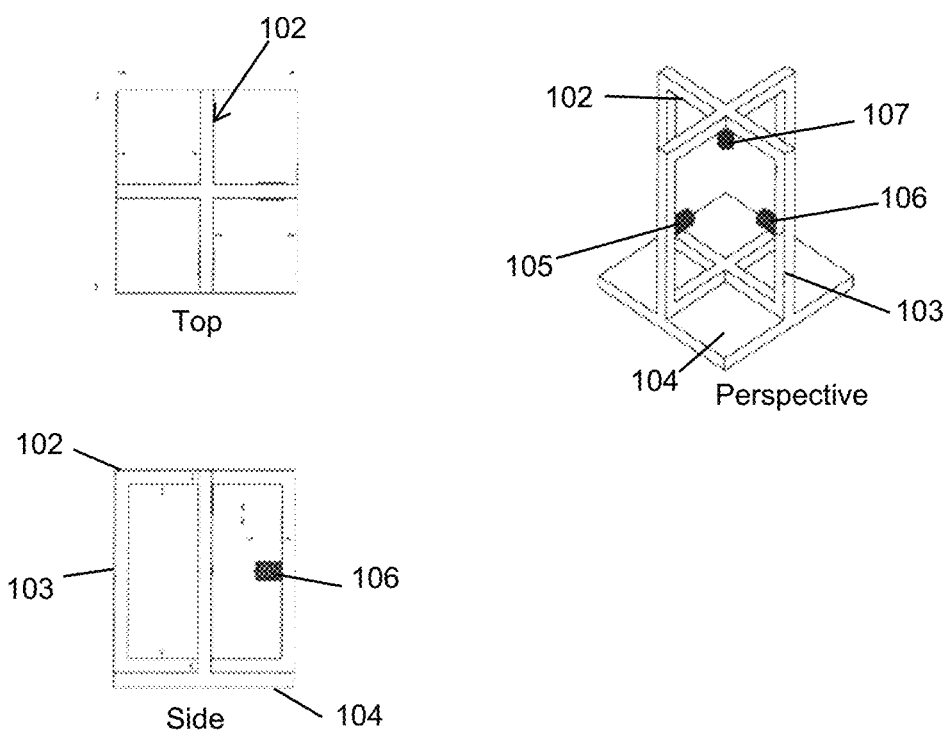
FIG. 6 illustrates a top, side, and perspective view of the exemplary system of FIG. 2.

In some embodiments and with particular reference to FIGS. 1, 4 and 5, the at least one sensor 130 is an accelerometer. The accelerometer is a sensor device that measures and outputs linear acceleration data. The acceleration is generally measured across three axes. However, this acceleration output data can include information in one to three directions. As acceleration is introduced to the MDML system 100, the axial forces required to maintain stable levitation change proportionally. The acceleration data provided by the accelerometer allows for the device controller 114 to control the current flow to the electromagnets 105-107 (via the current driving devices 125-127) to scale the electromagnetic force accordingly based on the newly introduced acceleration sensed by the accelerometer. For example, the force $F_s$ acting on the system is the acceleration G (in $G_s$), and $F_o$=initial force of system. $F_s=F_o*G$. In this way, a target object 150 within the volume V, is able to maintain a constant levitation state, or adjust the magnetic field such that the path of translation 503 of a target object 150 from a first positional state 501 to a second positional state 502 is maintained.

In some embodiments and with particular reference to FIGS. 1 and 4, the at least one sensor 130 is a three-dimensional position tracking system ("Position Tracking System") including an array or combination of sensors 130A, 130B, and 130C that generates an output of three-dimensional positions of the target object 150. The three-dimensional positions may be converted via the device controller 114 to a coordinate system, such as a (x, y, z) format, a spherical coordinate format, or any variation therein. The image data provided by the Position Tracking System allows the device controller 114 the precise location of the target object within the volume V. For example, and without limitation, on a per axis basis, a set of location data combined with a set of timestamps may be used to derive the position, velocity, and acceleration of the target object 150. The device controller 114 generates the movement information and based on the detected movement varies the magnetic field produced by the electromagnets 105-107 such that the target object 150 moves from a first position 501 along a predetermined path of motion 503 to a second position 502 within the volume V. In some embodiments, the position tracking system includes at least two image sensors 130A, 130B placed along two axes, e.g., the x and y axes, respectively, such that the three-dimensional coordinate system (e.g., x, y, z axes) is derived from the center of the computer vision tracked object given two sets of two-dimensional coordinates.

The at least two image sensors, in communication with a device controller 114, are generally configured to understand a current position of an object in terms of two-dimensional coordinates, relative to the origin (0,0). In some preferred embodiments, the pair of image sensors return the tilt angle of the tracked image/color/etc., described in greater detail below.

In some embodiments, the at least one sensor 130 is an orientation tracking system ("OTS") including an array or combination of sensors 130A-103C that generates an output from which an orientation of the target object 150 can be derived. In some embodiments, the OTS measures the angular position of the target object 150. The device controller 114, in communication with the OTS, generates rotation/orientation information of the target object 150 from a reference placement, e.g., a first positional state 501, to a current placement, e.g., a second positional state 502. The device controller 114 varies the magnetic field produced by the electromagnets 105-107 such that the target object 150 is rotated/orientated to a desired orientation state.

In some embodiments, the PTS and OTS share sensor components 130A-130C. That is, the OTS will use image data from the PTS, combined with the calculation of an angle theta to track the orientation of the target object 150. For example, and without limitation, the OTS is configured to track the orientation of a target object 150 by generating a cubic representation 131 of the target object 150, i.e., capturing images that correspond to faces of a cube. A first image sensor 130A tracking one face of the cubic representation 131 via image tracking can use the visibility of the captured image to grant an angle, theta, to understand the relative tilt of the tracked side. Each face of the cubic representation 131 has a different image, which is recognizable by each of the image sensors, and is tracked when one or more images are visible to the image sensor. This image data, given the angle theta, allows the OTS to know the orientation of a target object 150 within a large degree of accuracy. When the starting position of a cubic representation 131 has sides A and B visible to the first image sensor 130A and second image sensor 130B, respectively, the orientation of the cubic representation 131 of the target object 150 at this point, called origin, can be tracked by knowing positions of sides A and B relative to the first image sensor 130A and second image sensor 130B. A 180 degree rotation along a horizontal axis of the target object 150 would be measured by the OTS recognizing sides C and D, which are now in view of the first image sensor 130A and second image sensor 130B, respectively, with a tilt of 0 degrees.

In some embodiments, the at least one sensor 130 is an electric current sensor ("Electric Current Sensor") that measures and outputs a current value. That is, and in some embodiments, electrical current sensors are placed along the output lines of the current drivers, so that the actual current outputs is measured. The device controller 114 derives the current output in amperes from the electric current sensor output. That is, the current measurements from the electric current sensor are sent to the device controller 114 and undergo calculations to assist in the negation of hardware-based error. The device controller 114 does not make adjustments to its outputs based on unpredictable current—and, thus, field—outputs. Furthermore, the electric current data is accounts for any levitation failure, so as to understand the primary root of any encountered issues.

In other embodiments, the at least one sensor 130 is a temperature sensor that measures the kinetic energy of a material as temperature. In some embodiments, the temperature sensor is a thermocouple, although it is to be appreciated that other sensors 130 for measuring the temperature of a material may be substituted therein, for example, an infrared thermometer. The response of an object to a magnetic field is a function of the temperature of the material (among other factors). For example, the hotter an object, the less influence a magnetic field will have on the hot object. The temperature data allows for the MDML system 100 to adjust the generated magnetic field in response to changes in material characteristics based on temperature. For example, and without limitation, the device controller 114 is configured to increase the current flow to at least one electromagnet 105-107, in response to an increase of measured temperature by the temperature sensor. In this way, a target object 150 within the volume V, is able to maintain a constant levitation state, or the magnetic field is adjusted such that the path of translation 503 of a target object 150 from a first positional state 501 to a second positional state 502 is maintained even when experiencing extreme temperature changes. In some embodiments, temperature sensors are placed in contact with and/or in close proximity to the electromagnets 105-107. In this way, the temperature of the electromagnet is measured and the electrical current output due to changes in resistance of engage may be adjusted. In some embodiments, upon measure above a threshold temperature, the device controller 114 may start a cooling process, e.g., fans configured to move air over the electromagnets, to cool the electromagnets to a suitable operating temperature.

It is to be appreciated that while individual sensors and sensing systems are discussed herein, a combination of sensors and systems may be incorporated into the MDML system 100. For example, the MDML system 100 may include a gyroscope, accelerometer, temperature system, electric current sensor, position tracking system, and orientation tracking system, or any combination thereof.

The MDML system 100 is configured to produce a magnetic field to move a target object 150 from one point in three-dimensional space (a first positional state 501) to another (a second positional state 502) within a predefined volume V. The target object 150 is any object of any size or shape that is composed of a material that is magnetic or attracted to magnets. For example, and without limitation, the target object 150 may be composed of a ferromagnetic material. In some embodiments, a target object 150 may be modified for interaction with magnetic fields. That is, prior to placement in the MDML system 100, at least one magnet, for example, and without limitation, neodymium magnets, may be placed on the outer surface of the target object 150 such that the magnetic fields produced by the electromagnets 105-107 are able to move the surface magnet applied target object 150 within the volume V. Other ways to enhance the magnetic properties of a target object 150 include magnetic coatings or placing the object within a case made of magnetic material (e.g., an iron casing).

In some embodiments, electromagnetic shielding is provided to the system to eliminate radiofrequency electromagnetic radiation. The radiofrequency interference originates from electromagnetic waves such as those generated by electromagnetic fields. Shielding of particular components, e.g., the device controller 114 and the like, reduces undesirable effects of magnetic fields generated by the system on the particular component. Likewise, shielding of the electrical components of the system, reduces potential interference of those components with the magnetic field generated within the volume V used to levitate and move the target object 150. That is, the shielding of electrical components ensures consistent field geography in the immediate area of the target object 150. Additionally, the shielding results in more accurate measures by the at least one sensor of the system.

Figure 8:
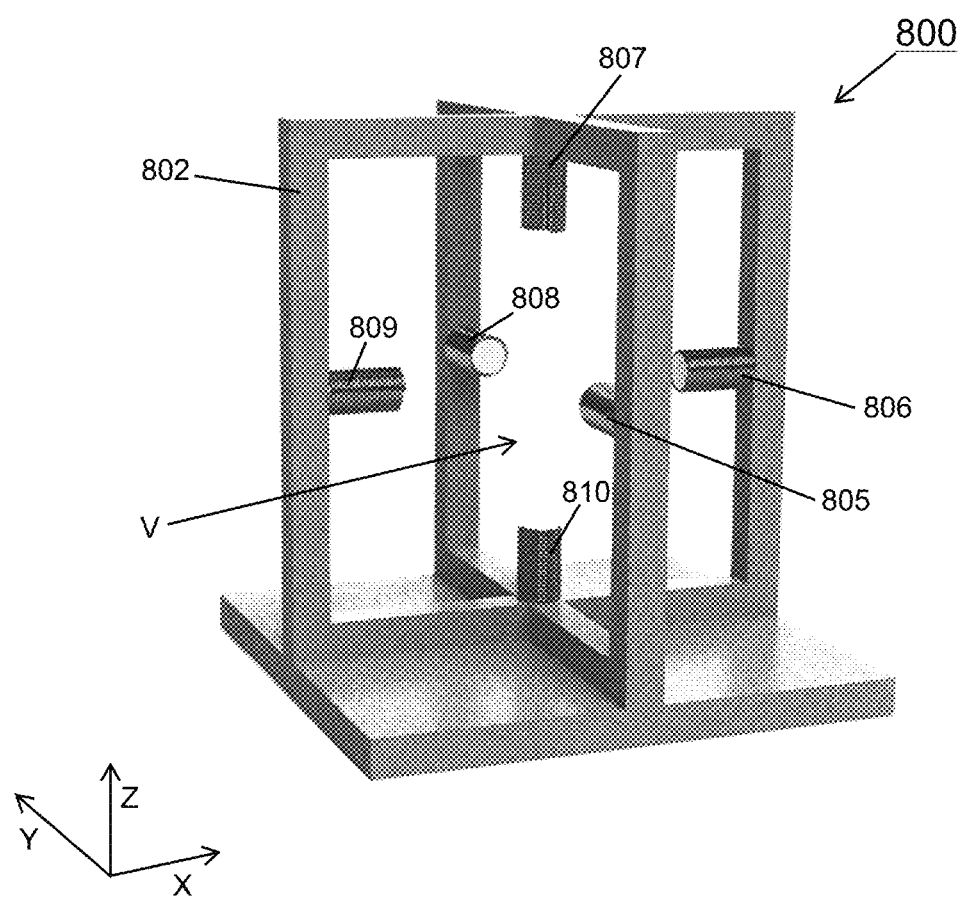
FIG. 8 is a drawing that illustrates an exemplary multi-dimensional magnetic levitation/translation system with six electromagnets in accordance with the present disclosure.
Figure 9:
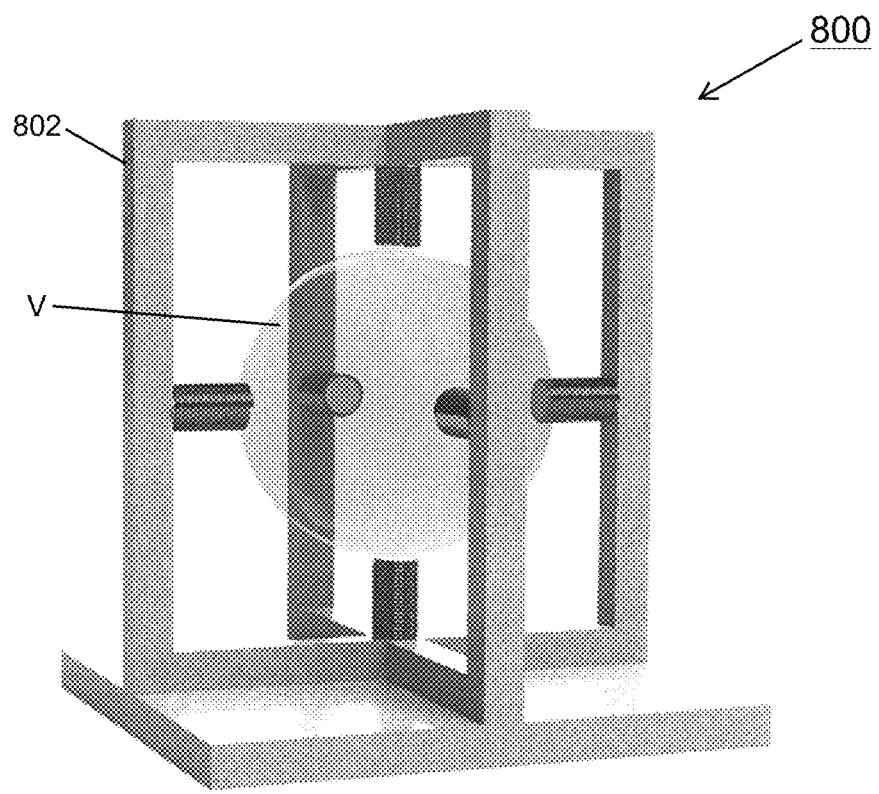
FIG. 9 is a drawing that illustrates the volume of control for the exemplary system of FIG. 8.

In accordance with another exemplary embodiment of the present disclosure and with reference to FIGS. 8 and 9, a multi-dimensional magnetic levitation system 800 includes six electromagnets 805-810. The multi-dimensional magnetic levitation ("MDML") system 800 includes a frame 802 surrounding a volume V. The frame 802 is configured to mount a plurality of electromagnets 805-810 in a spaced-apart relationship and at particular points around the perimeter of a frame volume V. The electromagnets 805-810 generate a magnetic field within the frame volume V that is generally shaped by the arrangement of the magnets, size of the magnets, and intensity of an applied electrical current to each of the electromagnets. That is, like the exemplary MDML System 100 of FIG. 1, the spaced apart electromagnets 805-810 are in electrical connection with a power supply (not pictured) and are configured to generate a magnetic field within the volume V upon application of an electric current.

In some embodiments and as illustrated in FIGS. 8 and 9, the six electromagnet system 800 includes two opposing electromagnets located on perpendicular axes and on opposing sides of the volume V. That is, opposed electromagnets 807 and 810 are located on the Z axis generating a magnetic field toward to volume V opposed electromagnets 806 and 809 are located on the X axis generating a magnetic field toward to volume V, and opposed electromagnets 805 and 808 are located on the Y-axis generating a magnetic field toward the volume V. The six magnet configuration may allow for a greater volume of control by adding electromagnets, which can act on the levitated object. When levitating a ferrous object, opposing electromagnets on each of the three axes allows for the system 800 to apply a force vector to the levitated object in any direction of any magnitude, limited only by the amount of current through the electromagnets.

The six magnet configuration of the MDML system 800 allows for the levitation of an object completely regardless of the motion or orientation of the apparatus. When utilizing a three electromagnet MDML system as illustrated in FIG. 2, the orientation of the system 100 is limited due to each electromagnets 105-107 ability only to pull a ferrous object closer to it. For example, using a three electromagnet configuration such as MDML system 100, levitation is difficult if the system 100 is rotated 180 degrees from the orientation with respect to the ground illustrated in FIG. 2. For levitation to be achieved, the composed force vector from the array of electromagnets must near perfectly oppose the force of gravity. This is difficult on a ferrous object (lacking its own magnetic field, thus not having the ability to be repelled) given a three electromagnet configuration in this flipped orientation.

Figure 10:
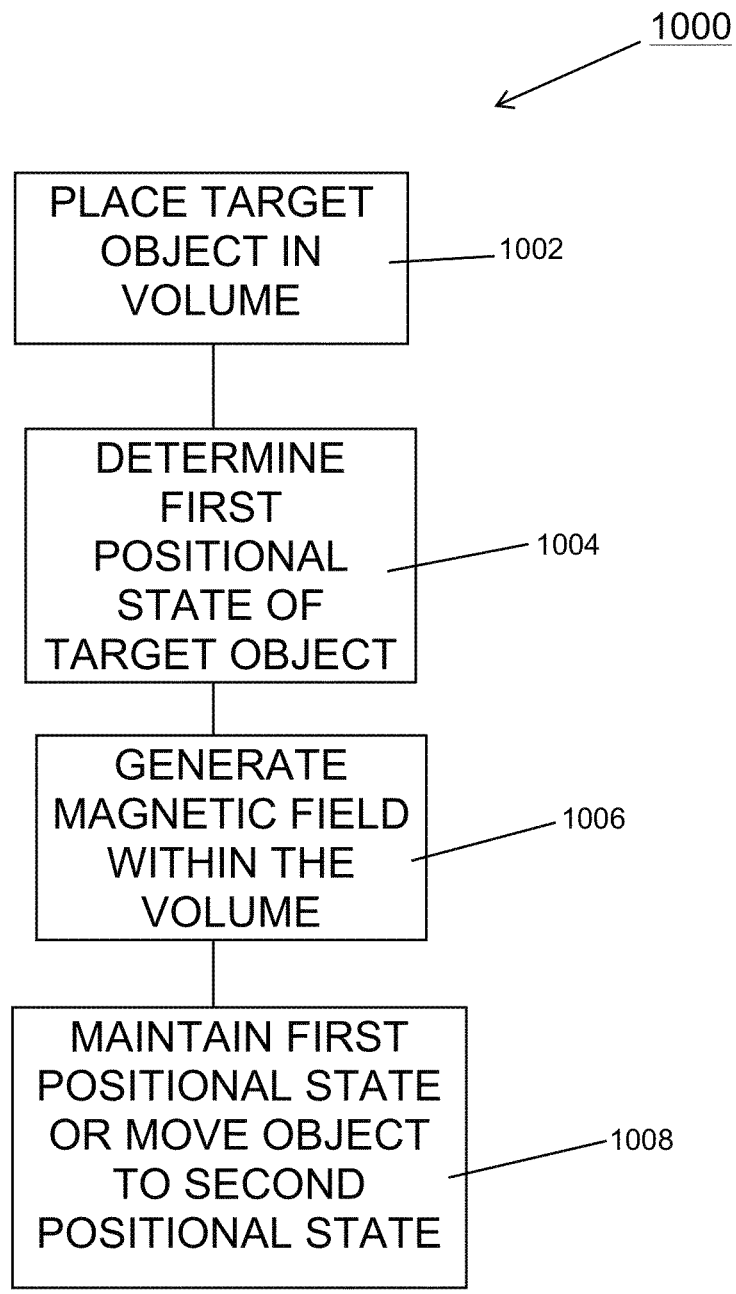
FIG. 10 is a flow chart of an exemplary method for levitating and translating a target object in accordance with the present disclosure.

In accordance with another aspect of the present disclosure and with particular reference to FIGS. 5 and 10, a method 1000 for contactless translation and/or levitation of a target object 150 is provided. The method 1000 includes, at block 1002, placing a target object 150 into a volume of control defined by a plurality of electromagnets mounted to a frame, such as volume V and frame 102 of FIG. 5.

Next, at block 1004, a first positional state 501 of the target object 150 is determined. In some embodiments, a positional state is a three-dimensional position of the target object 150 that may be defined by a set of three-dimensional coordinates, for example, and without limitation, spherical coordinates. In other embodiments, a positional state is an orientation of the target object 150. In yet still other embodiments, a positional state includes both a three-dimension location and orientation of the target object 150.

The positional state of the target object 150 within the volume V may be determined by at least one sensor including but not limited to, position sensors, movement sensors, optical sensors, temperature sensors, magnetic field sensors, and electrical current sensors as discussed above. A device controller, such as device controller 114 of FIG. 1, is configured to obtain raw data from the at least one sensor 130 and determine a first position 501 of the target object 150.

Next, at block 1006, a magnetic field is generated within the volume V by at least one electromagnet, such as electromagnets 105-107 attached to frame 102. That is, the device controller controls the application of electric current from a power source (e.g., power source 112) to the at least one electromagnetic to vary the magnetic field in at least one direction. At block 1008, the generated magnetic field applies a magnetic force on the target object 150 in a first positional state 501 to either maintain the first positional state 501 or translate the target object 150 to a second positional state 502. In some embodiments, the first positional state 501 is the same as the second positional state 502, wherein the magnetic field is configured to levitate the target object 150 in a single position.

In other embodiments, the first positional state 501 is different from the second positional state 502, wherein the application and manipulation of the magnetic field translates the target object 150 from the first positional state 501 having coordinates $(x_1, y_1, z_1)$ to a second positional state 502 having coordinates $(x_2, y_2, z_2)$. In some embodiments, the application and manipulation of the magnetic field translates the target object 150 in a desired (programmed) path 503 from the first positional state 501 to the second positional state 502. That is, an operator of the system may determine a desired path 503 and the current provided to each electromagnet such that the total electric field creates a net force on the object to travel along the desired path. While traditional x, y, and z coordinates are described, the positional state 502 may be defined in terms of spherical coordinates or other three-dimensional coordinate systems, cylindrical coordinates and the like.

It is to be appreciated that while a single frame system such as MDML system 100 and 800, having at least one associated electromagnet is expressly discussed herein, it is contemplated that multiple frame systems may be used to advance a target object 150 to a desired positional state. For example, and without limitation, two MDML systems e.g., systems 100 may be stacked and/or combined to provide continuous movement beyond the range of a single MDML system 100.

In some embodiments, the MDML system 100 is configured to utilize machine learning to form a control system capable of collecting input data, performing mathematical transformations on that data, and ultimately outputting electrical current values via some signal to control each of the electromagnets. The present configuration provides a less computationally intensive transformation stage. This means that machine-learning-based control systems can process relevant input data per unit time, allowing for faster training, decisions, and ultimately output—all of which combine for higher realized stability of the levitated target object 150. The described configuration allows for the function of machine learning to be parameterized such that the constant predictors undergo changes only in size of electromagnetic force, throughput amperage limits, and thus total output force limits as well as the shape, mass, and inherent magnetism of the levitated object. Furthermore, the described configuration allows for the MDML system 100 to scale more fluidly than other physically complicated variants. The algorithm/model for governing the control system may be abstracted out of training data via machine learning, e.g., a neural network.

The exemplary embodiments have been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art, which are also intended to be encompassed by the following claims.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

What is claimed is:

1. A system for levitating a target object comprising:
a frame defining a volume;
at least one electromagnet mounted to said frame, the at least one electromagnet configured to generate a magnetic field within the volume in response to an electric current;
a power source configured to supply the electric current to the at least one electromagnet;
a device controller operatively connected to the power source and the at least one electromagnet, the device controller configured to control the electric current to the at least one electromagnet; and
at least one sensor coupled to the frame configured to determine a direction and magnitude of external forces acting on the frame, wherein the device controller is configured to adjust the magnetic field based on the measured external forces to maintain a first positional state of the target object.

2. The system for levitating a target object according to claim 1 wherein the frame comprises at least one support structure, wherein the at least one electromagnet is mounted to the at least one support structure wherein the electromagnet is configured to generate a maximum field strength within said volume.

3. The system for levitating a target object according to claim 1 further comprising three electromagnets in a spaced-apart relationship, wherein the first electromagnet is positioned to generate a maximum field strength in a first direction, the second electromagnet is positioned to generate a maximum field strength in a second direction, and the third electromagnet is positioned to generate a maximum field strength in a third direction, wherein each of the first, second and third directions are perpendicular to each other.

4. The system for levitating a target object according to claim 1 further comprising a three dimensional positional tracking system comprising at least one sensor that determines a positional state of the target object by generating an output of three-dimensional coordinates representing the positional state of the target object.

5. The system for levitating a target object according to claim 1, wherein the device controller includes a processor in electronic communication with a storage medium, the processor configured to receive information from at least one sensor and determine a positional state of the target object.

6. The system for levitating a target object according to claim 1, further comprising a current driver device in communication with the device controller, the current driver device operable to supply a current to an associated electromagnet.

7. The system for levitating a target object according to claim 1, wherein the frame is composed of a non-ferrous material.

8. The system for levitating a target object according to claim 1 further comprising a temperature sensor configured to determine a temperature of the target object, and wherein the device controller adjusts the generated magnetic field in response to the determined temperature changes of the target object.

9. The system for levitating a target object according to claim 1 further comprising a temperature sensor configured to determine a temperature of the at least one electromagnetic, and wherein the device controller adjusts the current applied to the electromagnet in response to the determined temperature changes.

10. A system for levitating a target object comprising:
a frame defining a volume;
six electromagnets mounted to said frame, the at least one electromagnet configured to generate a magnetic field within the volume in response to an electric current;
a power source configured to supply the electric current to the at least one electromagnet;
a device controller operatively connected to the power source and at least one electromagnet, the device controller configured to control the electric current to the at least one electromagnet
wherein the first and second electromagnets are positioned in a spaced-apart relationship along a first axis, the third and fourth electromagnets are positioned in a spaced-apart relationship along a second axis, and the fifth and sixth electromagnets are positioned in a spaced-apart relationship along a third axis, wherein each of the first axis, second axis and third axis are perpendicular to each other.

11. A method of levitating a target object, the method comprising:
placing the target object within a volume defined by a frame;
determining a first positional state of the target object by at least one sensor;
generating a magnetic field by applying an electric current to at least one electromagnet and applying a magnetic force on the target object;
with a sensor coupled to the frame, determining a direction and magnitude of external forces acting on the frame; and,
adjusting the magnetic field based on the measured external forces to maintain a positional state of the target object.

12. The method of levitating a target object according to claim 11, wherein applying the magnetic force on the target object moves the target object from the first positional state to a second positional state.

13. The method of levitating a target object according to claim 11, further comprising determining a path of movement from a first positional state to a second positional state, wherein the application of the magnetic force on the target object moves the target object along the determined path of movement and wherein adjusting the magnetic field based on the measured external forces maintains the target object along the path of movement.

14. The method of levitating a target object according to claim 11, wherein the first positional state is a location in three-dimensional space with respect to the frame.

15. The method of levitating a target object according to claim 11 wherein the first positional state is an orientation of the target object with respect to the frame.

16. The method of levitating a target object according to claim 11, wherein the frame is configured to position three electromagnets in a spaced-apart relationship,
wherein the first electromagnet generates a first magnetic field and is positioned to generate a maximum field strength in a first direction, the second electromagnet generates a second magnetic field and is positioned to generate a maximum field strength in a second direction and, the third electromagnet generates a third magnetic field and is positioned to generate a maximum field strength in a third direction,
wherein each of the first, second and third directions are perpendicular to each other and,
wherein, the magnetic field generated is the product of the first, second and third magnetic fields.

17. The method of levitating a target object according to claim 11 further comprising,
measuring a temperature of the target object with a thermometer;
adjusting a magnetic field strength based on the measured temperature.

18. The method of levitating a target object according to claim 11 further comprising:
measuring a temperature of the at least one electromagnet,
adjusting the current applied to the electromagnet in response to the measured temperature changes of the at least one electromagnet.

* * * * *